(12) United States Patent
V et al.

(10) Patent No.: US 12,386,486 B2
(45) Date of Patent: *Aug. 12, 2025

(54) SYSTEMS AND METHODS FOR AN ACTIONABLE COCKPIT OF AN AIRCRAFT

(71) Applicant: HONEYWELL INTERNATIONAL INC., Charlotte, NC (US)

(72) Inventors: Varshaneya V, Bangalore (IN); Satyanarayan Kar, Bangalore (IN); Aditya Seluker, Bangalore (IN); Jason Bialek, Phoenix, AZ (US); Aaron T. Leander, Phoenix, AZ (US); Ashish N C, Bangalore (IN)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,046

(22) Filed: Mar. 1, 2022

(65) Prior Publication Data
US 2023/0021088 A1 Jan. 19, 2023

(30) Foreign Application Priority Data
Jul. 19, 2021 (IN) .............................. 202111032363

(51) Int. Cl.
*G06F 3/00* (2006.01)
*B64D 43/00* (2006.01)
(Continued)

(52) U.S. Cl.
CPC ........... *G06F 3/0484* (2013.01); *B64D 43/00* (2013.01); *G06F 3/0482* (2013.01); *G06F 2203/04803* (2013.01)

(58) Field of Classification Search
CPC ................... G06F 3/048; G06F 3/0482; G06F 2203/04803; G06F 3/0484; B64D 43/00
See application file for complete search history.

(56) References Cited

U.S. PATENT DOCUMENTS 6,597,294 B1 7/2003 Ariens
8,364,328 B2 1/2013 Hedrick
(Continued)

FOREIGN PATENT DOCUMENTS

KR 102248823 B1 5/2021

*Primary Examiner* — Jessica S Manno
*Assistant Examiner* — Andrew Chung
(74) *Attorney, Agent, or Firm* — Ingrassia Fisher & Lorenz, LLP

(57) ABSTRACT

Systems and methods providing an actionable cockpit in an aircraft. The actionable cockpit is a flight control system/method that includes a human machine interface (HMI) in the cockpit of the aircraft. The actionable cockpit is configured to effectively convert one or more non-interactive charts/pages and non-interactive windows and webpages displayed by pilots into interactive versions of themselves, and, to respond to pilot selections on the interactive versions by transferring selected information seamlessly between the multiple sources/applications. Additionally, embodiments of the actionable cockpit can map the pilot selections to an intended concept or target avionic system, suggest possible follow up actions related to the concept, and automatically begin an action when it is selected.

16 Claims, 5 Drawing Sheets

(51) Int. Cl.
*G06F 3/0482* (2013.01)
*G06F 3/0484* (2022.01)

(56) References Cited

U.S. PATENT DOCUMENTS

| | | | |
|---|---|---|---|
| 8,370,005 | B2 | 2/2013 | Wilson et al. |
| 8,515,658 | B1 | 8/2013 | Foster et al. |
| 8,661,358 | B2 | 2/2014 | Duncker et al. |
| 8,694,184 | B1 * | 4/2014 | Boorman .............. G06F 3/0481 715/810 |
| 9,530,318 | B1 | 12/2016 | Turner et al. |
| 9,719,799 | B2 | 8/2017 | Pandit et al. |
| 10,540,903 | B2 | 1/2020 | Kneuper et al. |
| 11,102,302 | B2 | 8/2021 | Watson et al. |
| 2005/0041044 | A1 * | 2/2005 | Gannon ................. G01C 23/00 345/660 |
| 2007/0050717 | A1 * | 3/2007 | Eklund ................ G11B 27/034 715/764 |
| 2012/0233256 | A1 * | 9/2012 | Shaham ................. G06Q 30/02 709/204 |
| 2013/0211701 | A1 * | 8/2013 | Baker .................. G08G 5/0026 701/120 |
| 2018/0181299 | A1 * | 6/2018 | Ouellette ............ G06F 3/04812 |
| 2019/0102407 | A1 | 4/2019 | Young et al. |
| 2019/0340932 | A1 * | 11/2019 | Gannon ............... G08G 5/0052 |
| 2020/0241874 | A1 * | 7/2020 | Chen ................... G06F 9/30025 |
| 2021/0027637 | A1 * | 1/2021 | Cazaux ................. G08G 5/045 |
| 2022/0215764 | A1 * | 7/2022 | Tuccio ................. G08G 5/0021 |

\* cited by examiner

SYSTEMS AND METHODS FOR AN ACTIONABLE COCKPIT OF AN AIRCRAFT

CROSS REFERENCE TO RELATED APPLICATION

The present application claims benefit of prior filed India Provisional Patent Application No. 202111032363, filed Jul. 19, 2021, which is hereby incorporated by reference herein in its entirety.

TECHNICAL FIELD

The following disclosure generally relates to flight control systems for aircraft. More particularly, the following disclosure relates to systems and methods for providing an actionable cockpit of an aircraft.

BACKGROUND

Pilots today refer to and use information from multiple sources/applications, such as, Charts, Web pages, EFB's, FBO pages during flight. In practice, a pilot may need to go back and forth between these multiple sources/applications to use information from them for various avionic systems.

A technical challenge is presented because these applications are not integrated with each other, so moving back and forth between them is not seamless. Instead, when a pilot wants to use information from one of the sources/applications for a different source/application or for a target avionic system, the pilot generally must manually transfer information between windows, requiring several button-clicks and intermediate steps. Additionally, once the information is transferred from a source/application to a target avionic system, there are often related follow up actions of the target avionic system that need to be taken by pilots, and, in available cockpits, these follow up actions also require manual actions. This heavy dependence on manual input and actions increases pilot cognitive workload.

Accordingly, improved flight display systems and methods that integrate the multiple sources/applications into an actionable cockpit are desired. Furthermore, other desirable features and characteristics of the disclosure will become apparent from the subsequent detailed description and the appended claims, taken in conjunction with the accompanying drawings, summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a display system for an aircraft includes a user input device that is configured to display an avionic display on a display device, and further includes a processor programmed to: retrieve at least one non-interactive chart from a database, convert the non-interactive chart into an actionable interactive chart, and in response to a pilot selection from the user input device on the actionable interactive chart, displaying a graphical user interface (GUI) object or an alphanumeric message on the avionic display associated with the selection.

In another embodiment, a method for a display system on an aircraft that includes a user input device and is configured to display an avionic display on a display device includes the steps of retrieving at least one non-interactive charts from a database, converting the at least one non-interactive chart into an actionable interactive chart, and in response to a pilot selection from the user input device on the actionable interactive chart, displaying a graphical user interface (GUI) object or an alphanumeric message on the avionic display associated with the selection.

Furthermore, other desirable features and characteristics of the display system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

DETAILED DESCRIPTION

Figure 1:
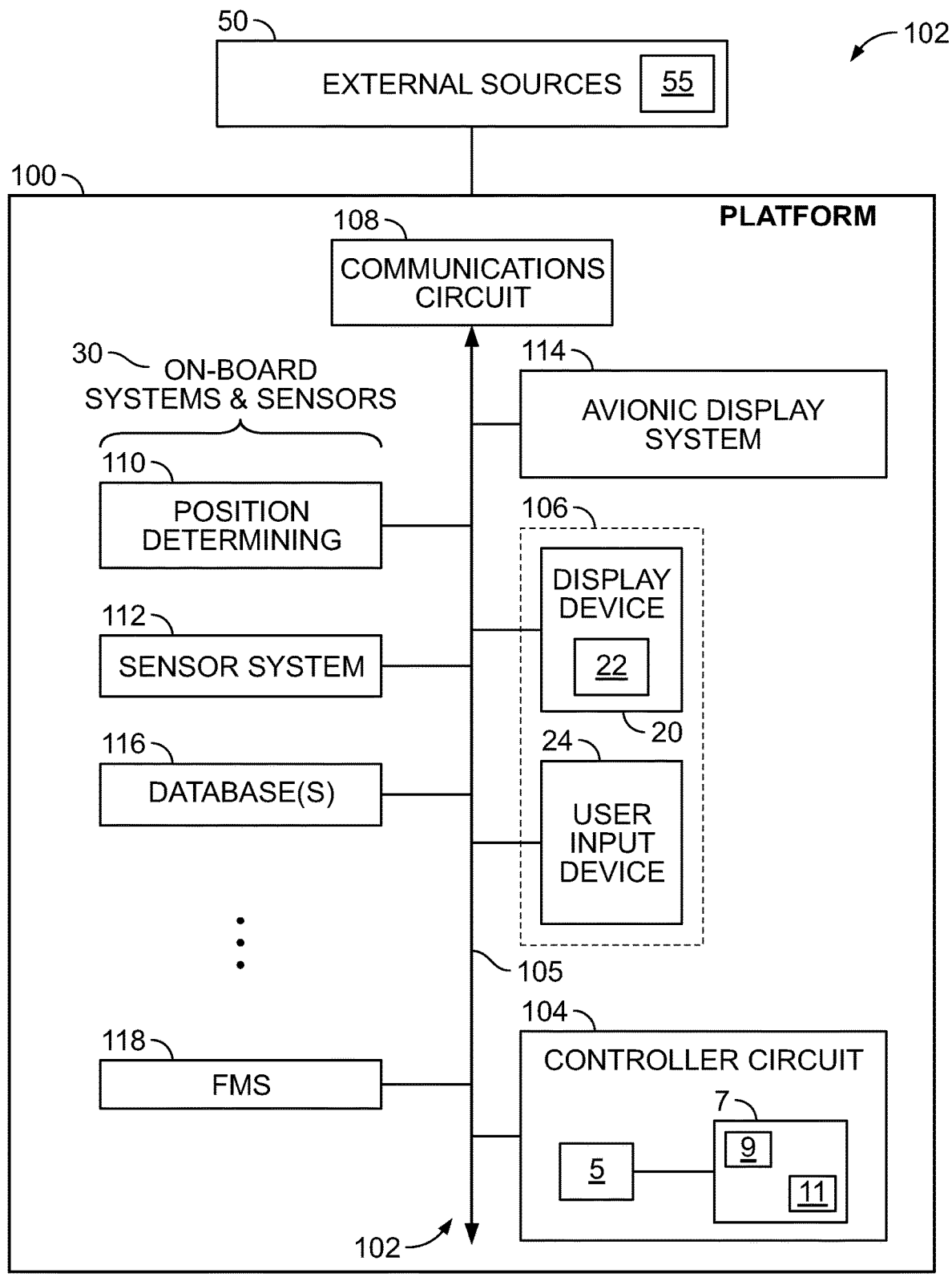
FIG. 1 shows a functional block diagram of an aircraft including various systems, including a system for providing an actionable cockpit of an aircraft, in accordance with exemplary embodiments of the present disclosure.

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

As mentioned, Pilots today refer to and use information from multiple sources/applications, such as, Charts, Web pages, EFB's, FBO pages during flight. Each of these multiple sources/applications generally has its own dedicated display window, which can only be accessed via a secure portal in the cockpit of the aircraft. In practice, a pilot may need to go back and forth between the windows of each of these multiple sources/applications and use information from them for other avionic systems.

Moving back and forth between these multiple sources/applications is not seamless. Instead, when a pilot wants to use information from one of the sources/applications for a different source/application, or for a target avionic system, the pilot generally must (i) access the information from the window for the source/application in the cockpit through the secure portal, and then (ii) manually transfer information between windows, requiring several button-clicks and intermediate steps. Additionally, once the information is transferred from the source/application to a target avionic system, there are often follow up actions related to the target avionic system that need to be taken by pilots, and, in available cockpits, these follow up actions also require manual actions. This heavy dependence on manual input and actions increases pilot cognitive workload, presenting a technical challenge.

A technical solution is disclosed herein in the form of systems and methods for providing an actionable cockpit of an aircraft (also referred to as an actionable interactive cockpit). As used herein, an actionable cockpit is a flight control system that includes a human machine interface (HMI) in the cockpit of the aircraft. The actionable cockpit is configured to effectively convert non-interactive charts/pages and non-interactive windows and webpages displayed by pilots into interactive versions of themselves, and, to respond to pilot selections on the interactive versions by transferring selected information seamlessly between the multiple sources/applications. The actionable cockpit uses a combination of AI based OCR and NLP technologies, and enables cockpit automation by extracting and understanding the intent of various content on non-interactive cockpit application pages and allow pilots to directly perform actions on these elements using touch or voice or triggered by external event (like an Aircraft state). Additionally, embodiments of the actionable cockpit can map the pilot selections to an intended concept or target avionic system, suggest possible follow up actions related to the concept, and automatically begin an action when it is selected.

Non-limiting advantages of the actionable cockpit include:
1. Reducing pilot workload and error by eliminating the need for manual reading from one system and data entry into another system;
2. Utilizing human factors studies by making the data movement intuitive and faster;
3. Easily adapting to retrofitting as well as forward fitting;
4. Providing a monetizable add-on feature to cockpits;
5. Providing a potentially recurring revenue based on the third-party and specialized charts interactivity services; and
6. Providing potential to outsource processing to Cloud APIs for specialized interactivity.

Further, pilots continue to use electronic flight bag (EFB) applications in aviation, and they continually add new features and applications to the EFB. This innovation seamlessly integrates such new applications and features within the cockpit without heavy investing in the development of the new applications and features. In summary, embodiments of the actionable cockpit transform the entire cockpit experience for the pilot. While the following exemplary embodiments are discussed in terms of an aircraft in flight, it should be appreciated that other embodiments may be employed in other contexts that currently rely on a regulated, periodically updated navigation database.

FIG. 1 is a block diagram of a system for providing an actionable cockpit of an aircraft (shortened herein to "system" 102), in accordance with an exemplary and non-limiting embodiment of the present disclosure. The system 102 may be utilized onboard a mobile platform to provide calibration of displayed synthetic images, as described herein. In various embodiments, the mobile platform is an aircraft 100, which carries or is equipped with the system 102. Aircraft 100 may be any type of vehicle that can travel through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft 100 may be "manned" in the conventional sense that the flight crew is present within the aircraft 100, or it may be manned remotely.

As schematically depicted in FIG. 1, system 102 includes the following components or subsystems, each of which may assume the form of a single device or multiple interconnected devices: a controller circuit 104 operationally coupled to: a HMI 106 (human-machine interface); a communications circuit 108; an avionic display system 114; and, one or more on-board systems and sensors 30. In various embodiments, the controller circuit 104 communicates with the other components of the system 102 via a communication bus 105.

The human-machine interface, HMI 106, may include a display device 20 and a user input device (UI) 24. In various embodiments, the HMI 106 includes at least one instance of an integration of the user input device 24 and a display device 20 (e.g., a touch screen display). In various embodiments, the HMI 106 may include a user input device 24 such as, any combination of a keyboard, cursor control device, voice input device, gesture input apparatus, or the like. The HMI 106 provides the pilot-facing "actionable cockpit" of the present invention.

The avionic display system 114 is configured to receive and process information from various on-board aircraft systems, sensors (30), and databases (supplied via the communication bus 105), perform display processing and graphics processing, and to drive the display device 20 to render features in one or more avionic displays 22. The term "avionic display" is defined as synonymous with the term "aircraft-related display" and "cockpit display" and encompasses display windows that are generated in textual, graphical, cartographical, and other formats. In various embodiments, the avionic display 22 is a primary flight display (PFD) or a navigation display. In various embodiments, the avionic display 22 can be, or include, any of various types of lateral displays and vertical situation displays on which map views and symbology, text annunciations, and other graphics pertaining to flight planning are presented for a pilot to view.

As is described in more detail below, the avionic display 22 generated and controlled by the system 102 can include graphical user interface (GUI) objects and alphanumerical input/output displays of the type commonly presented on the screens of MCDUs, as well as Control Display Units (CDUs) generally. Specifically, embodiments of the avionic display 22 include one or more two-dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display. In various embodiments of the actionable cockpit, the avionic display 22 may include, a web page window, a chart window, a third-party application window, an on-board system or sensor 30 window, or the like.

Accordingly, the display device 20 may be configured as a multi-function display (MFD) to include any number and type of image generating devices on which one or more avionic displays 22 may be produced. The display device 20 may embody a touch screen display. When the system 102 is utilized for a manned aircraft, display device 20 may be affixed to the static structure of the Aircraft cockpit as, for example, the aforementioned Head Up Display (HUD) unit, or a Head Down Display (HDD). Alternatively, display device 20 may assume the form of a movable display device (e.g., a pilot-worn display device) or a portable display device, such as an Electronic Flight Bag (EFB), a laptop, or a tablet computer carried into the Aircraft cockpit by a pilot.

In various embodiments, the HMI 106 further includes or has integrated therein an audio system capable of emitting speech and sounds, as well as of receiving speech input. In various embodiments, the HMI 106 may include any of: a graphical user interface (GUI), a speech recognition system, and a gesture recognition system. Via various display and graphics systems processes, the controller circuit 104 and avionic display system 114 may command and control the generation, by the HMI 106, of a variety of graphical user interface (GUI) objects or elements described herein, including, for example, tabs, buttons, sliders, and the like, which are used to prompt a user to interact with the human-machine interface to provide user input, and to activate respective functions and provide user feedback, responsive to received user input at the GUI object.

The on-board systems and sensors 30 generally include a position-determining system 110, a sensor system 112, one or more database(s) 116, and a flight management system (FMS) 118. In various embodiments, the on-board systems and sensors 30 also include an automatic pilot (AP) system.

The position-determining system 110 may include a variety of sensors and performs the function of measuring and supplying various types of aircraft status data and measurements to controller circuit 104 and other aircraft systems (via the communication bus 105) during aircraft flight. In various embodiments, the aircraft status data includes, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. The position-determining system 110 may be realized as one or more of a global positioning system (GPS), inertial reference system (IRS), or a radio-based navigation system (e.g., VHF omni-directional radio range (VOR) or long-range aid to navigation (LORAN)), and it may include one or more navigational radios or other sensors suitably configured to support operation of the aircraft 100.

In some embodiments, the position-determining system 110 may also obtain and/or determine the heading of the aircraft 100 (i.e., the direction that aircraft 100 is traveling relative to some reference) using a magnet compass or a magnetometer, for example. The position-determining system 110 may also include a barometric altimeter such that the position of the aircraft 100 may be additionally determined with reference to a barometric altitude. In some embodiments, the GPS may alternatively or additionally provide altitude information as part of the position-determining system 110. As such, in an exemplary embodiment, the position-determining system 110 is capable of obtaining and/or determining the instantaneous position and altitude of the aircraft 100, and the position-determining system 110 generates aircraft status data for the aircraft, including the current location of the aircraft 100 (e.g., the latitude and longitude) and the altitude and heading of the aircraft 100. The position-determining system 110 may provide this aircraft status data to the controller circuit 104 and the flight management system (FMS) 118 to support their operation, as described herein.

The sensor system 112, as used herein, is a forward-facing sensor system mounted on the mobile platform 100, configured to obtain real-time sensor images. During aircraft operation at an airport, the sensor system 112 provides a sensor image frame depicting airport features surrounding the aircraft position and location. Non-limiting examples of the sensor system 112 include a camera, EVS Infrared, and millimeter wave system. In some embodiments, the sensor system 112 includes a camera and associated circuitry.

In various embodiments, onboard database(s) 116 may be used to store two- or three-dimensional map data, including airport features data, geographical (terrain), buildings, bridges, and other structures, street maps, including the databases 116. In practice, the one or more database(s) 116 may be realized using two or more different onboard databases, each being a computer-readable storage media or memory. The database(s) 116 may include a chart database and a NOTAM database. The data stored in the database(s) 116 may be regulated and periodically updated, as directed by a regulating entity, such as the Federal Aviation Administration (FAA). The database 116 may store a plurality of pre-loaded charts associated with the FP. In still other embodiments, all or a portion of database 116 may be disposed external to the aircraft.

FMS 118 provides the primary navigation, flight planning, and route determination and en route guidance for the aircraft 100. The FMS 118 may contribute aircraft status data provided to controller circuit 104, such as, the aircraft's current position, attitude, orientation, and flight direction (e.g., heading, course, track, etc.), the aircraft's airspeed, ground speed, altitude (e.g., relative to sea level), pitch, and other important flight information if such information is desired. In various embodiments, FMS 118 may include any suitable position and direction determination devices that are capable of providing controller circuit 104 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.). FMS 118 and controller circuit 104 cooperate to guide and control aircraft 100 during all phases of operation, as well as to provide other systems of aircraft 100 with flight data generated or derived from FMS 118.

The system 102 may also include, and thus receive web pages and third-party applications from, one or more external sources 50. Additionally, external sources 50 can include a flight data center (FDC) and/or an air traffic control (ATC), e.g., via controller pilot data link communication (CPDLC), and may include a weather subscription service, other subscription services, a traffic monitoring service, neighbor traffic, ground stations, and the like. The external sources 50 may also include one or more processors 55 that are programmed to implement one or more functions of the processes described herein.

It should be appreciated that aircraft 100 includes many more additional features (systems, databases, etc.) than the illustrated systems 106-118. For purposes of simplicity of illustration and discussion, however, the illustrated aircraft 100 omits these additional features.

The term "controller circuit," as appearing herein, broadly encompasses those components utilized to carry-out or otherwise support the processing functionalities of the system 102. Accordingly, in various embodiments, the controller circuit 104 can be implemented as a programmable logic array, application specific integrated circuit, system on a chip (SOC), or other similar firmware, as well as by a combination of any number of dedicated or shared processors, flight control computers, navigational equipment pieces, computer-readable storage devices (including or in addition to memory 7), power supplies, storage devices, interface cards, and other standardized components.

In various embodiments, as depicted in FIG. 1, the controller circuit 104 is realized as an enhanced computer system, having one or more processors 5 operationally coupled to computer-readable storage media or memory 7, having stored therein at least one novel firmware or software program (generally, computer-readable instructions that embody an algorithm) for carrying-out the various process tasks, calculations, and control/display functions described herein. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the processor 5.

Figure 2:
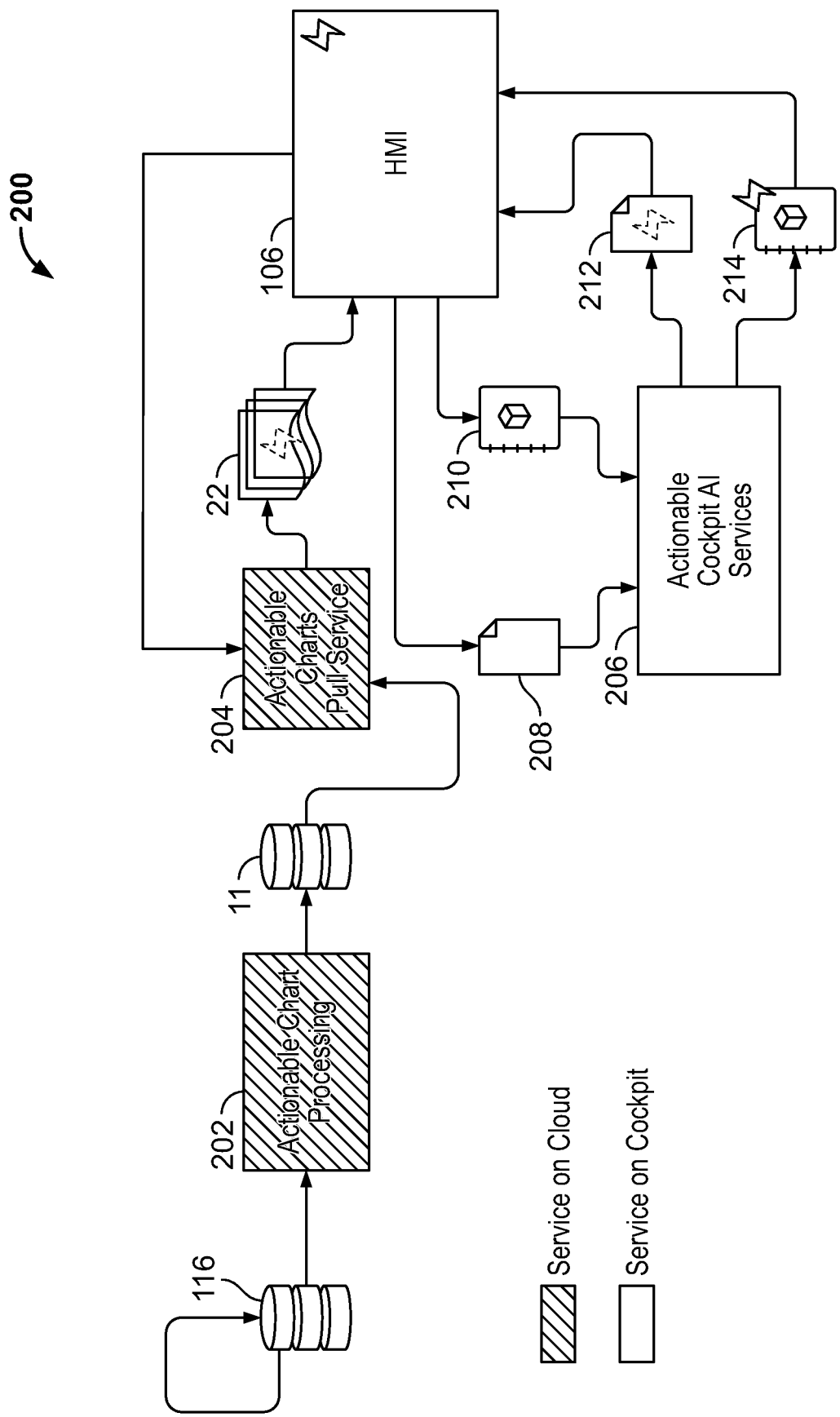
FIG. 2 is a process flowchart illustrating process modules that may be present in a system for providing an actionable cockpit of an aircraft, in accordance with one exemplary embodiment of the present disclosure.

As FIG. 1 also depicts, the memory 7 additionally includes an actionable chart database 11. The actionable chart database 11 stores charts that have been retrieved from the database 116 and that have been converted, by the system 102, into actionable interactive charts. In various embodiments, this conversion is performed by an actionable chart process module (FIG. 2, 202). In various embodiments, and as will be described further below, actionable interactive web pages and third-party pages may also be generated from non-interactive web pages and from non-interactive third-party pages, and stored in the actionable chart database 11.

During operation, the controller circuit 104, and hence the processor 5, may be programmed with and execute the at least one firmware or software program (for example, program 9, described in more detail below) that embodies an algorithm for receiving, processing, enabling, generating, updating and rendering, described herein, to thereby perform the various process steps, tasks, calculations, and control/display functions described herein.

Controller circuit 104 may exchange data, including real-time wireless data, with one or more external sources 50 to support operation of the system 102 in embodiments. In this case, the controller circuit 104 may utilize the communication bus 105 and communications circuit 108.

In various embodiments, the communications circuit 108 includes the hardware and software to support one or more communication protocols for wireless communication between the processor 5 and external sources, such as satellites, the cloud, communication towers and ground stations. In various embodiments, the communications circuit 108 supports wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 108 supports communication with technicians, and/or one or more storage interfaces for direct connection to storage apparatuses. In various embodiments, the communications circuit 108 is integrated within the controller circuit 104.

FIG. 2 is a flowchart illustrating process modules for a method 200 that may be performed by a system providing an actionable cockpit of an aircraft, in accordance with one exemplary embodiment of the present disclosure. In various embodiments, the method 200 may be referred to as an Actional Cockpit Runtime (ACR) engine, a core technology which is applied as an invisible interactive layer on top of the available non-interactive page/objects (e.g., charts, webpages on a cockpit browser, and 3rd party apps). For the purpose of a simplified and non-limiting example, the tasks and process steps of the ACR may be performed by multiple uniquely tasked process modules that are implemented by the processor 5 in the controller circuit 104. By task, the following process modules may be included:

An ACR engine 200, as may be appreciated, may be implemented solely by the processor 5 programmed within the controller circuit 104 or together with the external processor 55. The depicted ACR engine 200 includes Actionable Chart processing module 202, which is configured to convert non-interactive charts retrieved from database 116 into interactive actionable charts, and to store the interactive actionable charts in the actionable chart database 11. This conversion is accomplished by understanding the layout information in the non-interactive charts using artificial intelligence (AI) technologies, such as DBNet, convolutional recurrent neural network (CRNN) and transformers trained with weights to identify elements on areas of a chart layout that are expected to support interactivity.

An actionable chart pull service 204 associates pilot selections and input, such as the flight plan, which were made, for example, using the HMI 106, to select a subset of the actionable charts stored in the actionable chart database 11 and to coordinate in which window and/or avionic display 22 the interactive actional chart(s) is (are) presented to the pilot at any given time.

The depicted ACR engine 200 also includes an actionable cockpit processing module 206. When included, the actionable cockpit processing module 206 interacts via the HMI 106. In combination with the actionable chart processing module 202, the actionable cockpit processing module 206 is configured to recognize non-interactive or semi-interactive charts or windows from web pages 208 and/or third-party apps 210, and to convert at least portions of these charts or windows into interactive web pages 212 or third party apps 214. For example, FBO (fixed base operator) or other telephone numbers, NOTAM information, weather information, may be extracted from various web pages on a cockpit browser, and flight planning data, weight and balance data updates, logbook data updates, briefing data, and checklist updates may be retrieved from, for example, an electronic flight bag (EFB).

In various embodiments, the ACR engine 200 may also implement a disambiguation service. This service, when included, declutters crowded text so that the ACR engine 200 can easily extract and understand the text. To do so, it calculates an average text density of a displayed page or window. It marks a group of text to be decluttered when its density is greater than an average of the given page or window. Once the average text density (i.e., the degree of clutter) is determined, appropriate zoom levels are applied to the page or window to declutter it. It may also use color to identify overlaps.

The ACR engine 200 may, prior to operation, be programmed with an AI chart model/algorithm that is trained specific to aviation concepts developed for charts (referred to herein as the charts model). The AI chart model embodies rules and concepts from different known types of charts such as, for example, airport diagrams, en-route charts, SID, and approach charts. In addition to the AI chart model, some embodiments may also include separate models built for extracting and interpreting generic concepts from the above-mentioned aviation webpages 208 and 3rd party apps 210.

The ACR engine 200 extracts and understands user selections, via the HMI 106, such as text clicked/touched on a window of the avionic display 22. Based on its understanding of the text, appropriate action pop-ups may be rendered for sending the data to either a scratchpad or to set GP altitudes, headings, tune radios, or a target avionics system. This ensures that a pilot can interact with the text seamlessly without having to remember and use the keypad for keying in. The ACR engine 200 also has the capability to read and understand text at different orientations on the page/window, as well as horizontal left to right.

Figure 3:
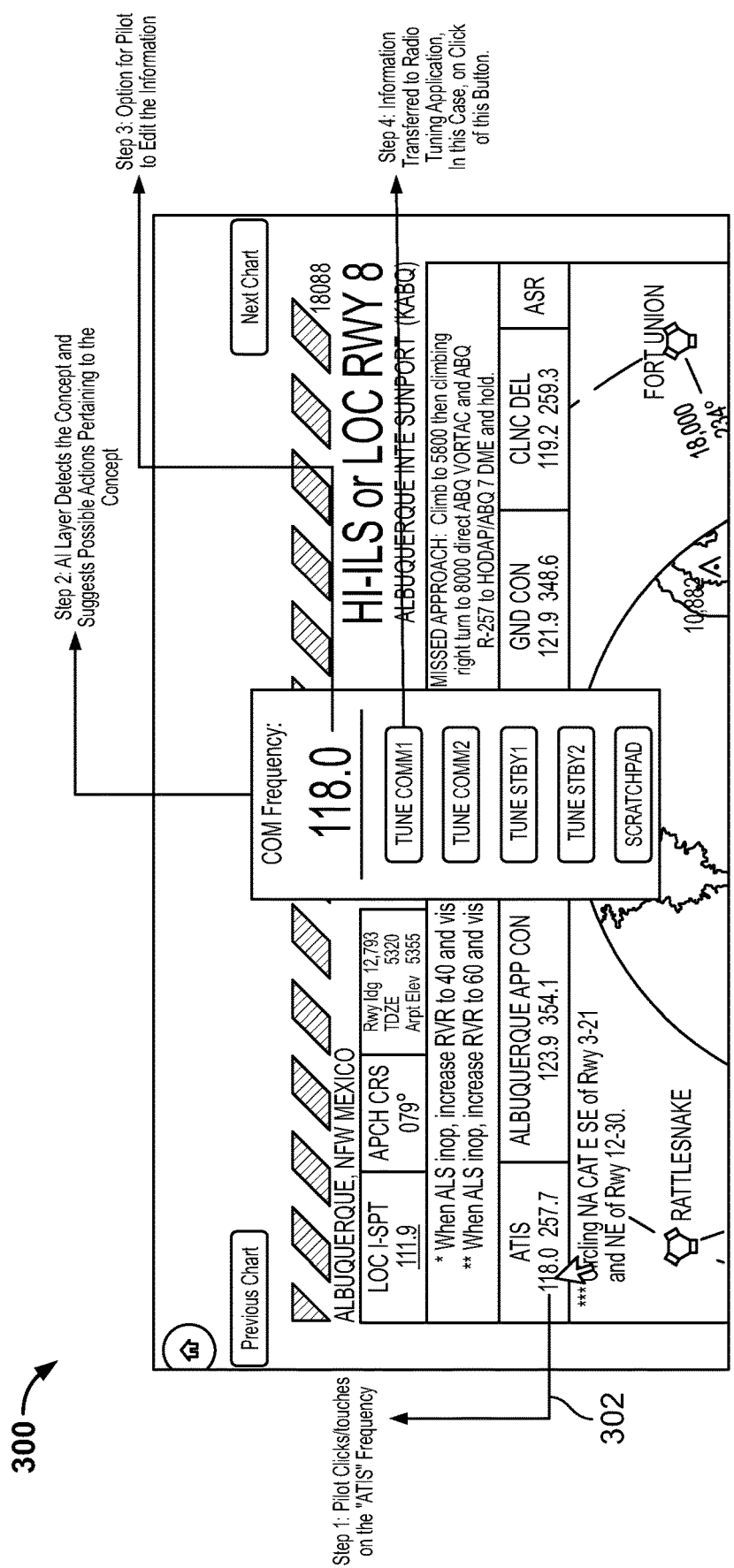
FIGS. 3-4 are examples of displayed windows in an actionable cockpit of an aircraft, in accordance with exemplary embodiments of the present disclosure.
Figure 4:
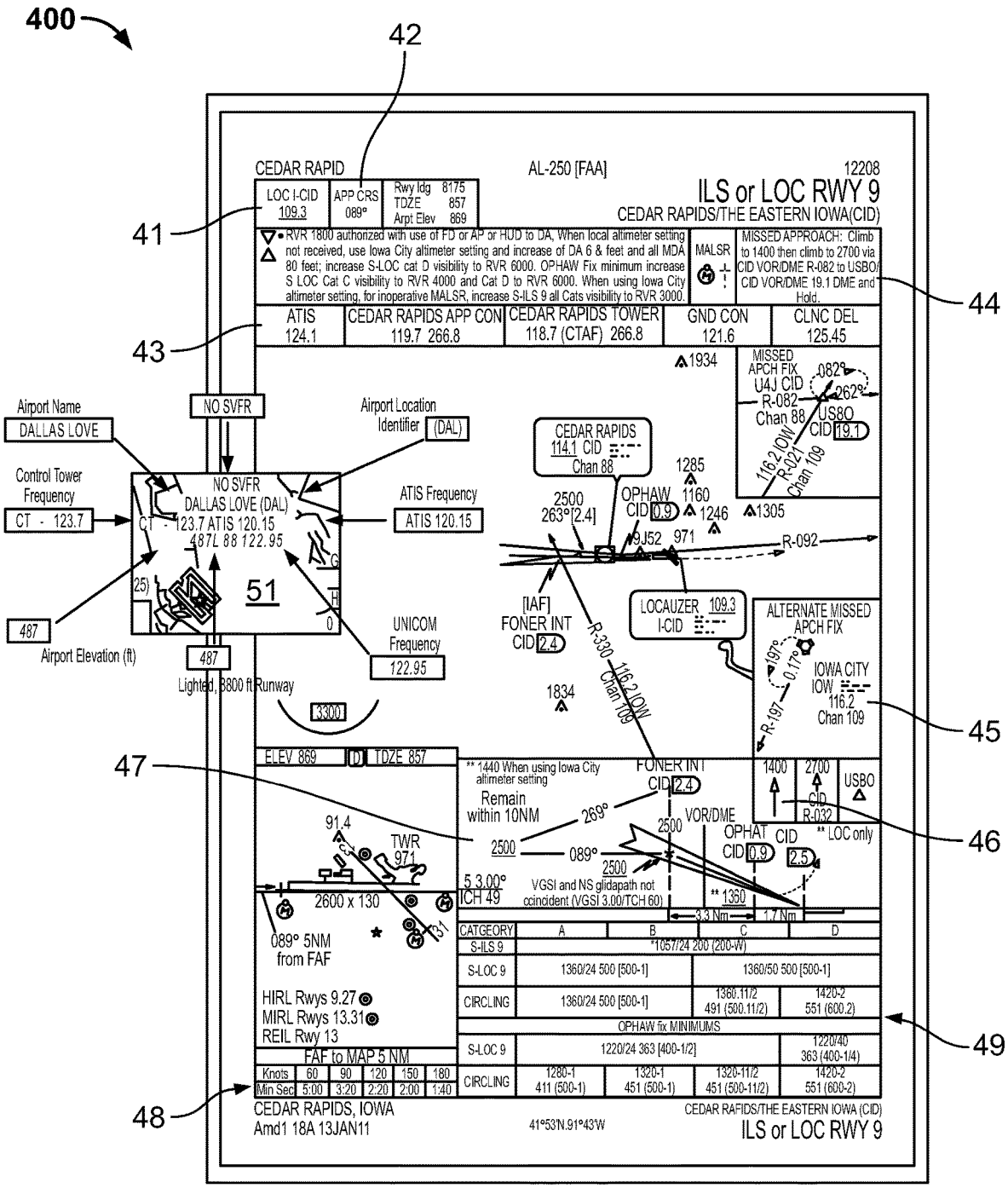

FIGS. 3-4 are examples of displayed charts/windows in an actionable cockpit of an aircraft, in accordance with exemplary embodiments of the present disclosure. FIG. 3 provides an example in which a charts page 300 is displayed in or on the avionic display 22 and the pilot wants to tune to an ATIS frequency (at 302) presented on the charts page. Without the present invention, the pilot needs to remember the ATIS frequency, navigate to the radio page, and manually enter ATIS frequency into the Radio page and switch from standby to active. The Actionable Cockpit aims to solve this technical problem using a combination of AI based OCR and NLP technologies, where it enables cockpit automation by extracting and understanding the intent of various content on non-interactive cockpit application pages and allow pilots to directly perform actions on these elements using touch or voice or triggered by external event (like an Aircraft state).

Embodiments of the actionable cockpit achieve this workflow as follows. At step 1, pilot input selection (in the form of touching or clicking on the charts page at the location of the ATIS frequency) is received. At step 2, the system 102, responsive to the received input, maps the input to an intended concept and, based thereon, suggests possible actions related to the concept. One possible action is for the pilot to edit the information at step 3. Following this example, the system 102 may generate and render a GUI pop up providing the information "Com Frequency: 118.0" with the action options "COMM1", "COMM2", "STBY1", "STBY2" and "SCRATCHPAD." Responsive to receiving a pilot selection of one of the action options at step 4, the system 102 may directly transfer the information it to the appropriate location.

In addition to tuning radios, as shown in FIG. 3, embodiments of the actionable cockpit can set GP altitudes and headings, responsive to receiving pilot input, such as the clicking/touching on the page or window at the location of the appropriate text on the non-interactive chart. Embodiments of the actionable cockpit also provide an option for a pilot to select information and move it to a smart scratchpad so that it can be sent elsewhere, such as, to tune radios, set GP target altitudes and set headings.

Embodiments of the actionable cockpit can also disambiguate, or individually recognize, a pilot selection of a minimums or a visibility, listed at the bottom of the chart page. As an example, an approach chart may display the information "5229/24" in the designated area. Embodiments of the actionable cockpit automatically identify and understand "5229" as an altitude and "24" as visibility.

Embodiments of the actionable cockpit can also use color-coding to visually distinguish text from background artifacts like Airway lines, terrain contours, symbols for minimum altitudes and other things that occlude or congest a displayed page or window.

FIG. 4 provides another example in which a charts page 400 is displayed in or on the avionic display 22. Embodiments of the actionable cockpit respond to the following pilot selections (in the form of touching or clicking on the charts page at the respective location). At 41, tune a Loc frequency to an ILS Active/Standby. At 42, send an approach course to either the FMS or an automatic pilot (AP). At 43, extract frequencies and edit them or send them to the smart scratchpad. At 44, extract missed approach steps from a textual missed approach (MA) notification and feed this information to a flight controller. At 45, extract alternate MA data. At 46, extract specific MA actions by selecting the symbols displayed. At 47, select and send a glideslope angle update to AP. At 48, set approach speeds at various points on a flight path. At 49, send an updated minima to one or more of various avionic systems (e.g., updating a barometric altitude in a primary flight display (PFD)). At 52, connect the actionable cockpit, with the appropriate frequency, to a non-air traffic control air-ground communication facility or fixed base operator (FBO) to communicate therewith.

As was previously described above, in addition to enabling actionable interactions with various aspects of the charts, embodiments of the actionable cockpit are pre-programmed to convert web pages and other pages that may come up through secure portals like ForeFlight, Weather, the FBOs, and etc. In an embodiment, displayed phone numbers are made actionable, and, responsive to a pilot selection of a phone number, the system 102 may dial the phone number. In an embodiment, displayed weather data (wind speed, visibility, runway conditions, etc.) are made actionable, and, responsive to a pilot selection of weather data, the system 102 may extract the data for a smart scratchpad or other application. In an embodiment, fuel price-based flight plan data are made actionable, and, responsive to a pilot selection of an item of weather data, the system 102 may extract the data for a smart scratchpad or other application. In an embodiment, airport congestion data are made actionable, and, responsive to a pilot selection of an item of airport congestion data, the system 102 may extract the data for a smart scratchpad or other application.

Figure 5:
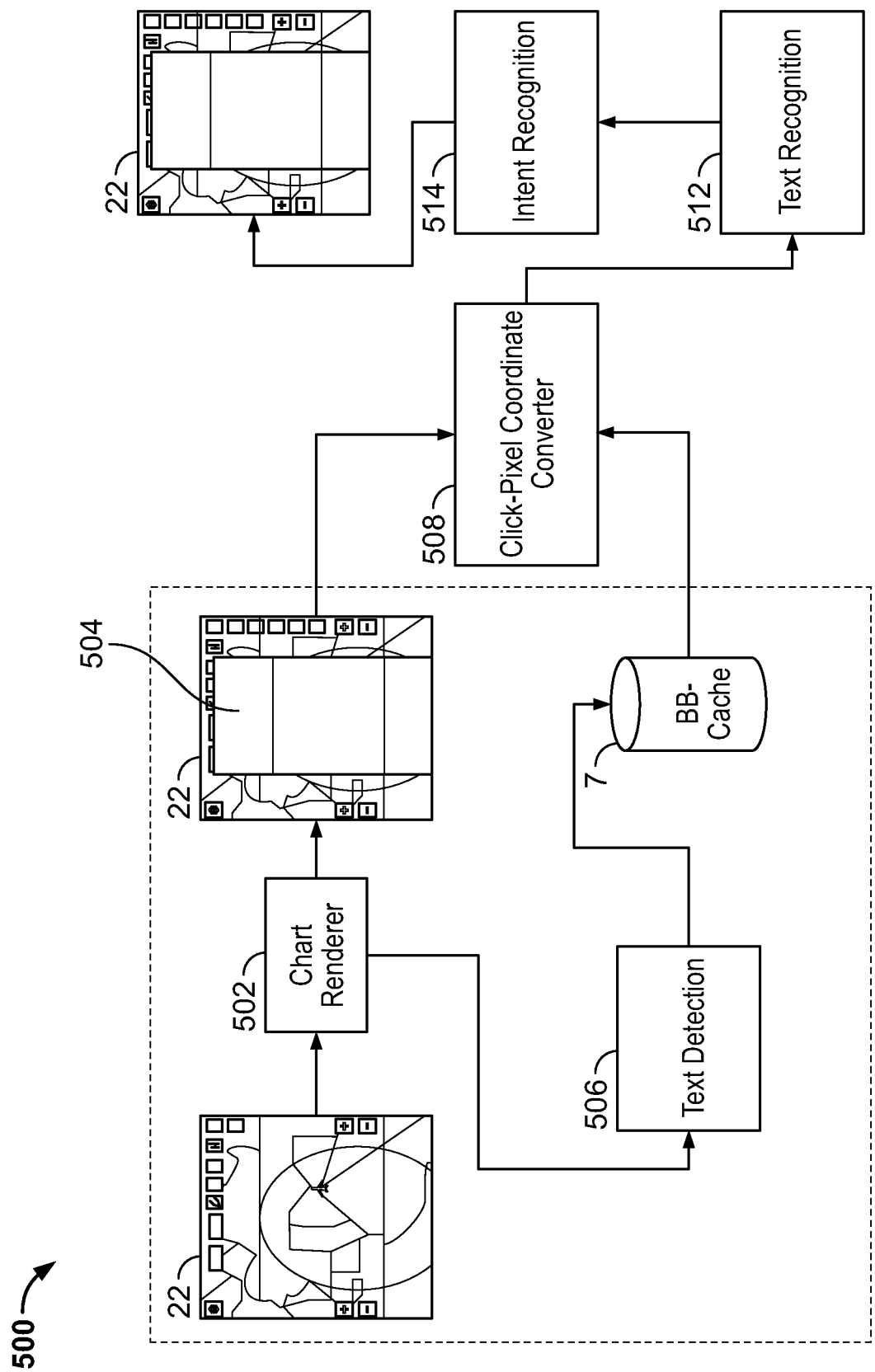
FIG. 5 is a process flowchart illustrating process modules that may be present in a system for providing an actionable cockpit of an aircraft, in accordance with another exemplary embodiment of the present disclosure.

The ACR engine 200 described above and depicted in FIG. 2 pre-computes inferences for target avionic systems display pages/windows. These pre-computed inferences are likely to be used in specific flight operations and will reduce a respective delay to begin an action when the delay is associated with a pilot response time during pilot interaction. In some embodiments, however, the ACR engine may compute the inferences on-demand and in real-time. The on-demand computations, which are implemented using what is referred to herein as a lazy inferencing process (LIP), reduce latency and assist in quickly responding to text that may be selected by a pilot on a non-interactive chart. One example embodiment of the LIP 500 is depicted in FIG. 5 as a flowchart illustrating process modules that may be implemented in system 102 and will now be described. Before doing so, however, it should be noted that although the LIP 500 is, for convenience, depicted and described in the context of non-interactive charts, it is also applicable to non-interactive or semi-interactive charts or windows from web pages 208 and/or third-party apps 210, as described above.

Turning now to FIG. 5, the LIP 500 begins when a pilot, via the HMI 106, selects a non-interactive chart. The selected chart is processed by a chart renderer 502. The chart renderer 502, which is implemented in processor 5, renders the selected chart 504 on the HMI 106, and more specifically on avionic display 22. The chart renderer 502 also transmits the selected chart 504 to a text detection module 506, which is also implemented in processor 5. The text detection module 506, using any one of the previously mentioned AI technologies, looks at different regions of the chart 504 where text fields are located. These text regions, in the form of bounding boxes, are then cached in, for example, memory 7, so that if (or when) the same exact chart 504 is selected again in the future, the text detection process need not be once again implemented, but instead may be retrieved directly from the cached memory. Thus, those operations within the dashed line in FIG. 5 are preferably implemented only once per selected chart. That is, unless or until the chart is revised or otherwise updated.

Thereafter, if a pilot, again via the HMI 106, selects a particular portion of text on the rendered chart 504, the processor 5, implementing a pixel-coordinate converter 508, converts the actual coordinates on the display 22 to the coordinates associated with the cached text regions of the chart. The pixel-coordinate converter 508 also retrieves the associated cached text region from the memory 7 and supplies it to a text recognition module 512. The text recognition module 512, which is also implemented in processor 5, processes the retrieved text region to determine each character in the retrieved text region and supplies these characters to an intent recognition module 514.

The intent recognition module 514, which is also implemented in processor 5, processes the text to determine what specific information is associated with the text, to thereby determine the intent of the selection. For example, it determines whether the text is a radio frequency, an altitude, a phone number, or the like. Once it determines the intent, the intent recognition module 514 then commands the display 22 to render the appropriate user interfaces, such as the pop-up windows or other GUIs previously described.

Accordingly, the present disclosure has provided several embodiments of systems and methods for an actionable cockpit. The renderings of the interactive actionable charts and automated performance of follow up actions related to the target avionic system decrease cognitive load and provide an objectively improved HMI over available display systems.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A display system for an aircraft, comprising:
   a display device;
   a user input device configured to display an avionic display on the display device; and
   a processor programmed to:
      retrieve at least one non-interactive chart having initially non-interactive text from a database;
      reference at least one pre-programmed layout of the non-interactive chart that indicates which initially non-interactive text of the at least one non-interactive chart is expected to have interactivity and is pre-associated with an action to be performed, wherein an attempt at selection of the initially non-interactive text on a display of the non-interactive chart does not cause an action;
      convert the non-interactive chart into an actionable interactive chart based on the reference to the at least one pre-programmed layout, and comprising mapping the initially non-interactive text to the action to form actionable text according to the reference and that results when a pilot selects the actionable text on the actionable interactive chart, wherein the converting includes defining bounding boxes that are not visible on the actionable interactive chart, and wherein the actionable interactive chart being an interactive version of the non-interactive chart itself without changing the appearance of the non-interactive chart by adding GUI objects at the actionable text that indicate the actionable text is actionable;
      initially display the actionable interactive chart after the converting and without displaying a graphical user interface (GUI) object at the actionable text on the avionic display that indicates the actionable text is actionable, and initially without displaying a visible GUI object associated with the action of selecting the actionable text;

in response to a pilot selection of the actionable text from the user input device on the actionable interactive chart that is displayed without the GUI object:
    displaying a GUI object pop-up window or an alphanumeric message pop-up window associated with the action on the avionic display and associated with the selection and without changing the appearance of the actionable text itself, and
    performing the action wherein the action is associated with an avionics system.

2. The display system of claim 1, wherein:
the at least one non-interactive chart is one of a plurality of non-interactive charts in the database; and
the processor is further programmed to:
    convert each of the plurality of non-interactive charts into a respective actionable interactive chart, thereby generating a plurality of actionable interactive charts; and
    store the plurality of actionable interactive charts in an actionable chart database.

3. The display system of claim 1, wherein the processor is further programmed to implement a system command associated with the GUI object pop-up or the alphanumeric message pop-up, responsive to the pilot selection.

4. The display system of claim 1, wherein the at least one pre-programed layout distinguishes between multiple distinct areas on the avionic display by associating a respective system command with each area of the multiple distinct areas.

5. The display system of claim 4, wherein the processor is further programmed to convert the at least one non-interactive chart into the actionable interactive chart by employing a trained neural network for the at least one pre-programmed layout.

6. The display system of claim 1, wherein the processor is further programmed to:
    convert web pages into actionable interactive web pages and convert third-party pages into actionable interactive third-party pages.

7. The display system of claim 1, wherein the processor is further programmed to detect the pilot selection when a user selects text displayed on the avionic display via a click of the user input device or by a touch on a touch-sensitive display.

8. The display system of claim 1, wherein the processor is further programmed to utilize colors to visually distinguish text from background airway lines, terrain contours, and symbols that indicate minimum altitudes.

9. A method for a display system on an aircraft, the display system including a user input device, and configured to display an avionic display on a display device, the method comprising:
    retrieving at least one non-interactive chart having initially non-interactive text from a database;
    referencing at least one pre-programmed layout of the non-interactive chart that indicates which initially non-interactive text of the at least one non-interactive chart is expected to have interactivity and is pre-associated with an action to be performed, wherein an attempt at selection of the initially non-interactive text on a display of the non-interactive chart does not cause an action;
    converting the at least one non-interactive chart into an actionable interactive chart based on the reference to the at least one pre-programmed layout, and comprising mapping the initially non-interactive text to the action to form actionable text according to the reference and that results when a pilot selects the actionable text on the actionable interactive chart, wherein the converting includes defining bounding boxes that are not visible on the actionable interactive chart, and wherein the actionable interactive chart being an interactive version of the non-interactive chart itself without changing the appearance of the non-interactive chart by adding GUI objects at the actionable text that indicate the actionable text is actionable;
    initially displaying, on the avionic display, the actionable interactive chart after the converting and without displaying a graphical user interface (GUI) object at the actionable text that indicates the actionable text is actionable, and initially without displaying a visible GUI object associated with the action of selecting the actionable text; and
    in response to a pilot selection of the actionable text from the user input device on the actionable interactive chart that is displayed without the GUI object:
        displaying a GUI object pop-up window or an alphanumeric message pop-up window associated with the action on the avionic display and associated with the selection and without changing the appearance of the actionable text itself, and
        performing the action wherein the action is associated with an avionics system.

10. The method of claim 9, wherein the at least one non-interactive chart is one of a plurality of non-interactive charts in the database, and wherein the method further comprises:
    converting each of the plurality of non-interactive charts into a respective actionable interactive chart, thereby generating a plurality of actionable interactive charts; and
    storing the plurality of actionable interactive charts in an actionable chart database.

11. The method of claim 9, further comprising implementing a system command associated with the GUI object pop-up or the alphanumeric message pop-up, responsive to the pilot selection.

12. The method of claim 9, wherein the at least one pre-programed layout distinguishes between multiple distinct areas on the avionic display by associating a respective system command with each area of the multiple distinct areas.

13. The method of claim 12, further comprising converting the at least one non-interactive chart into the actionable interactive chart by employing a trained neural network for the at least one pre-programmed layout.

14. The method of claim 9, further comprising:
    converting web pages into actionable interactive web pages and converting third-party pages into actionable interactive third-party pages.

15. The method of claim 9, further comprising detecting the pilot selection when a user selects text displayed on the avionic display via a click of the user input device or by a touch on a touch-sensitive display.

16. The method of claim 9, further comprising utilizing colors to visually distinguish text from background airway lines, terrain contours, and symbols that indicate minimum altitudes.

* * * * *